T. J. P. AANSTOOTS.
PROTRACTOR.
APPLICATION FILED JAN. 24, 1912.
1,058,512.
Patented Apr. 8, 1913.
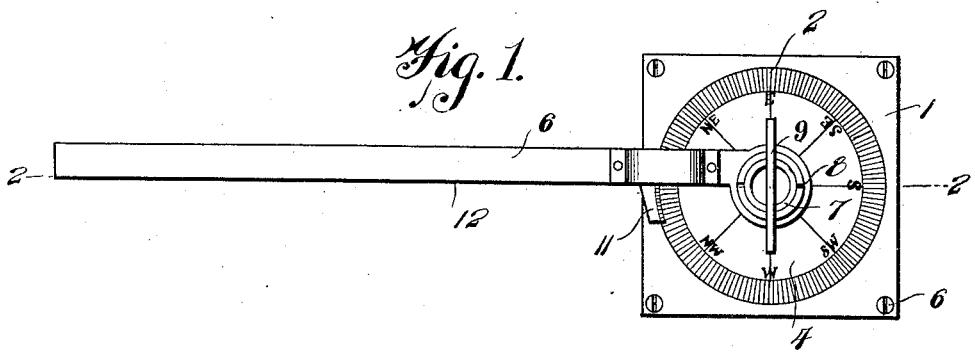
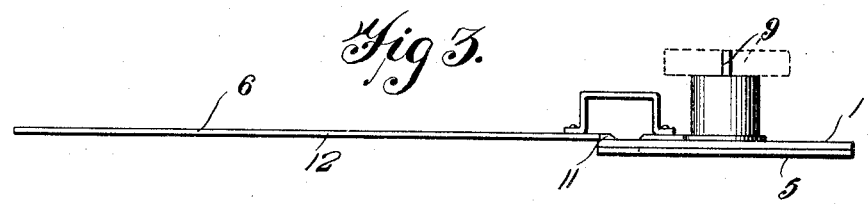
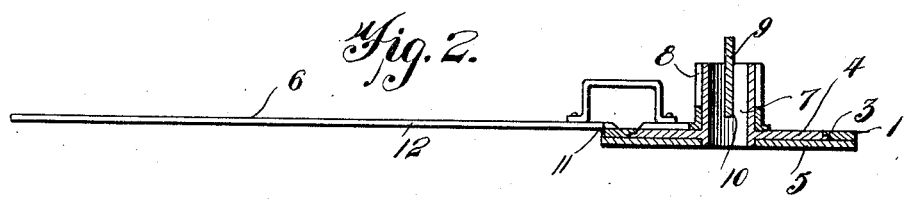
Witnesses
Carroll Bailey.
R. B. Cavanagh.
Inventor
T. J. P. Aanstoots,
By Victor J. Evans
Attorney

UNITED STATES PATENT OFFICE.

THEODORE J. P. AANSTOOTS, OF PASSAIC, NEW JERSEY, ASSIGNOR OF ONE-HALF TO MYRON L. SEVERSON, OF PASSAIC, NEW JERSEY.

PROTRACTOR.

1,058,512.   Specification of Letters Patent.   Patented Apr. 8, 1913.

Application filed January 24, 1912. Serial No. 673,027.

*To all whom it may concern:*

Be it known that I, THEODORE J. P. AANSTOOTS, a subject of the Queen of the Netherlands, residing at Passaic, in the county of Passaic and State of New Jersey, have invented new and useful Improvements in Protractors, of which the following is a specification.

The present invention relates to certain novel and useful improvements in protractors and has particular application to an instrument of this class adapted especially for use in plotting the course of vessels at sea.

In carrying out my invention it is my purpose to provide a course protractor which may be used as a substitute for the parallel rules and other device commonly employed for the purpose above mentioned.

As is well known to those familiar with maritime affairs the plotting of the vessel's course by means of the parallel rule and similar instruments is an exceedingly tedious one. By the use of my invention the course may be marked rapidly, quickly and accurately, and in a relatively shorter time than by the use of common methods.

Still a further object of my invention is to provide an instrument which is exceedingly simple in its construction and which embodies the desired features of accuracy and reliability. Furthermore the device may be manufactured at a relatively low cost.

With the above recited objects and others of a similar nature in view, my invention consists in the construction, combination and arrangement of parts set forth in and falling within the scope of the appended claims.

In the accompanying drawings:—Figure 1 is a top plan view of a course protractor embodying my invention. Fig. 2 is a cross sectional view taken on the line 2,—2, of Fig. 1. Fig. 3 is a view in side elevation. Fig. 4 is a perspective view of the rule and its connected parts.

Referring now to the accompanying drawings in detail the numeral 1 indicates the top plate of the instrument upon the inside edge of which is marked the 360° circle which is indicated at 2. The under side of the inside edge is rabbeted as is shown at 3, to receive the movable compass rose 4. The bottom plate 5 is screwed to the top plate 1, as shown at 6, and holds the compass rose in position.

The course rule of the instrument is shown at 6 and turns upon the thimble 7 of the compass rose. The portion of the course rule which fits over the thimble is slotted as at 8 so it can be compressed to fit tightly and snugly.

The numeral 9 designates the key which fits into the slotted portions of the compass rose as at 10 by means of which said rose may be turned.

The vernier of the instrument is indicated by the numeral 11.

The edge 12 of the rule proper is on a direct line through the center of the instrument and reads zero at its edge when set on the correct north.

The above is a brief description of the mechanical or structural features of my invention, and its operation is substantially as follows:—In the use of the instrument it is placed upon the ship's chart with the rule cutting the ship's position and destination or direction, with such the ship's position near the edge of the instrument. With the body of the instrument cutting or running parallel with some meridian, the compass rose of the instrument is turned to the proper position as shown by the rose on the chart. The instrument then reads the proper course to be steered in degrees, minutes and seconds.

It will be seen that I have provided an exceedingly simple yet accurate and reliable instrument by which the proper course may be quickly plotted.

While I have herein shown and described one particular embodiment of my invention I wish it to be understood that I do not confine myself to all the precise details of construction herein set forth, as modification and variation may be made without departing from the spirit of the invention, or exceeding the scope of the appended claims.

What I claim is:—

1. A device of the class described comprising a plate formed with an opening and having an annular row of graduations thereon, a compass rose disposed within the opening in said plate and rotatable relatively thereto, a thimble on said compass rose, a course rule having one end encircling said thimble and slotted, a vernier carried by said rule and coöperating with the graduations on said plate, and means for rotating said compass rose.

2. A device of the class described comprising a plate formed with an opening and having an annular row of graduations thereon, a compass rose disposed within the opening in said plate and rotatable relatively thereto, a thimble on said compass rose, a course rule having one end encircling said thimble and slotted, a vernier carried by said rule and coöperating with the graduations on said plate, and a key for rotating said compass rose.

In testimony whereof I affix my signature in presence of two witnesses.

THEODORE J. P. AANSTOOTS.

Witnesses:
 WYNAND P. KLAASEN,
 LAMMERT DEKKER.

---

Copies of this patent may be obtained for five cents each, by addressing the "Commissioner of Patents, Washington, D. C."